July 6, 1937.  C. G. KRONMILLER  2,086,037
MOTOR OPERATED CONTROLLER
Filed Oct. 28, 1935
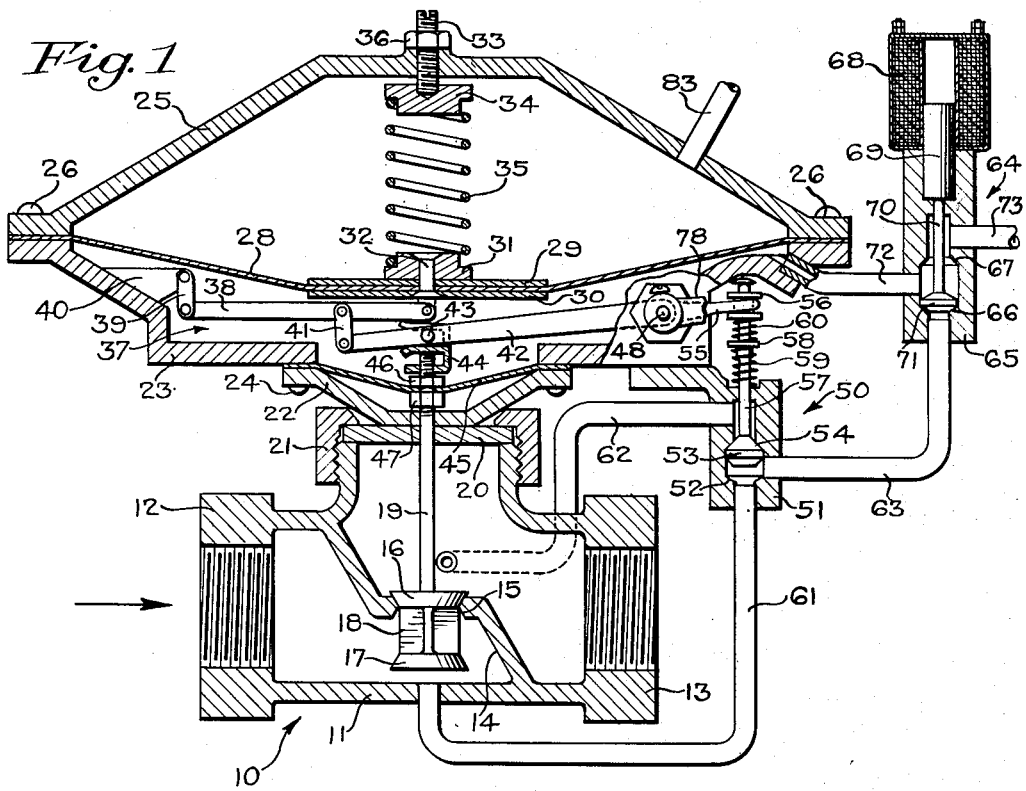
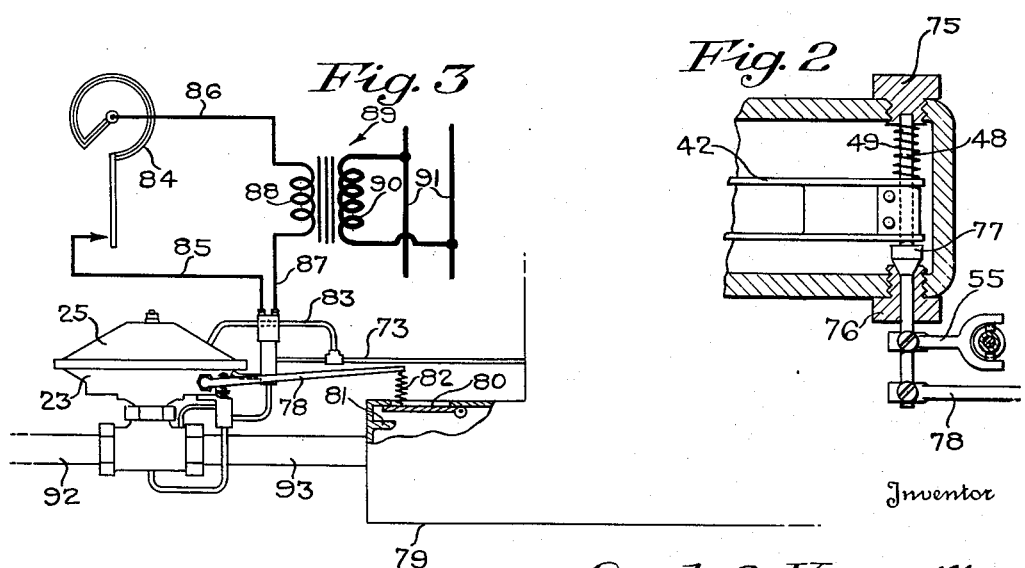
Inventor
Carl G. Kronmiller
By George H. Fisher
Attorney Patented July 6, 1937

2,086,037

UNITED STATES PATENT OFFICE 2,086,037

MOTOR OPERATED CONTROLLER

Carl G. Kronmiller, Minneapolis, Minn., assignor to Minneapolis-Honeywell Regulator Company, Minneapolis, Minn., a corporation of Delaware Application October 28, 1935, Serial No. 47,093

17 Claims. (Cl. 236—80)

My invention relates to a motor operated controller, and more particularly to a device for controlling the flow of fuel to a fluid fuel burner, such as gas to a gas burner.

Since the permissible drop in gas pressure between the line pressure and that available at the burner is quite limited, it is very desirable to combine the shut-off and pressure regulating valves into one structure thus eliminating two separate valves each with an inevitable pressure drop therein. While it is old to provide a motor operated valve which functions both as a shut-off and as a pressure regulating valve, such valves have always had certain disadvantages which lessened their desirability. In some cases the actuating mechanism was so complicated as to unduly increase the expense and the chance of faulty operation thereof. In other cases, where a pressure motor type of valve actuation was used a pair of diaphragms were employed to form two pressure motors, one of which controlled the valve for shut-off purposes and the other of which controlled the valve to give pressure regulation. This had the disadvantage that there was the danger of lack of coordination in the functioning of the two motors. Furthermore, the use of two diaphragms presents a double danger of the device being rendered inoperative by reason of a rupture in the diaphragm. In still others of these valves, no provision was made for shutting off the valve in case of an abnormal drop in inlet pressure. This is highly undesirable since if the pressure drops to too low a value to support combustion, it is desirable that the valve be turned off.

An object of the present invention is to provide a fluid motor actuated valve which functions as both a pressure regulating and shut-off valve, and in which a single diaphragm is employed.

A further object of the present invention is to provide a combined pressure regulating and shut-off valve in which the valve is moved to closed position upon an excessive drop in inlet pressure.

A further object of the present invention is to provide a fluid actuated motor employing a single valve means which during a certain portion of the movement of the wall of the pressure motor tends to move towards open position upon increase in pressure, and during a different portion of the movement of the wall tends to move toward closed position upon increase in pressure.

A further object of this invention is to provide a fluid motor actuated valve wherein the valve means comprises a plurality of valve discs, one of which functions as a pressure regulator and the other of which functions as a shut-off valve, both of said valve discs being controlled by a single diaphragm.

Other objects of the invention will be apparent from the accompanying specification, claims and drawing, of which:

Figure 1 is a view partly in section of my motor actuated controller,

Figure 2 is a detailed view of a sealing means employed therein, and

Figure 3 is a view of my controller associated with a gas furnace and suitable thermostatic controlling means.

Referring to Figure 1 of the drawing, a valve 10 is shown as housed in a valve housing 11, having the usual inlet 12 and outlet 13. The valve body is also provided with the usual transverse partition 14 which has an opening 15 therein to provide a valve seat. This opening is preferably oppositely bevelled to provide a seat in either direction. A plurality of valve discs 16 and 17 are connected by a spider 18 and are attached to a valve stem 19. The valve housing 11 is closed at the top by a disc 20 which is firmly secured to the valve body in fluid tight relation by means of a screw-threaded collar 21. Attached to the disc 20 by any suitable fastening means is a member 22 of an inverted frusto-conical shape. This member is flanged at its upper end and supports a lower casing 23 which is secured thereto by any suitable means such as screws 24. An upper casing 25 is provided and is secured to the lower casing by screws 26. A diaphragm 28 is clamped between the two casings and forms, with the casing 23, a pressure motor for actuating the valve. The diaphragm 28 has plates 29 and 30 secured on opposite sides thereof. These plates are secured to the diaphragm and to a spring guide 31 by a rivet 32. Threaded through the upper casing 25 is a set screw 33 which extends into a recess in a second spring guide 34. A spring 35 is interposed between said two spring guides and serves to bias diaphragm 28 downwardly. The biasing force of spring 35 can obviously be adjusted by means of the set screw 33 and a nut 36 is provided to lock the screw in adjusted position.

The diaphragm 28 is connected to the valve stem 19 by suitable linkage 37 which may be of any suitable form which gives a mechanical advantage to the diaphragm. For purposes of illustration, a linkage employing a lever 38 which is pivoted at one end to a bracket extending from disc 30 and at the other end to a movable link 39 which in turn is pivoted to a bracket 40. At a point intermediate its ends link 38 is connected through a short link 41 with the end of a lever 42. A pin 43 extends transversely through this lever which lever may be channel-shaped in cross section as indicated in Figure 2. The pin 43 is located between the upper two prongs of a clip 44 which is provided with three prongs, the lower of which is in threaded engagement with the valve stem 19 and the upper two of which slidably engage opposite sides of the pin 43. The diaphragm 45 serves to seal the lower portion of casing 23 and is clamped along its outer edge between casing 23 and member 22. At its center it is secured between two nuts 46 and 47 which are tightly clamped against these diaphragms to prevent escape of fluid through the diaphragm adjacent the valve stem.

A control valve 50 comprises a valve body 51 having upper and lower valve seats 52 and 54. A valve 53 is provided which is adapted to engage with the lower seat 52 upon downward movement thereof, and with the upper seat 54 upon upward movement thereof. This control valve is actuated by means of lever 42 through a shaft 48 and an arm 55. The arm 55 is provided with a forked portion which slidably engages a collar 56 which is slidably located on a valve stem 57. On the valve stem 57, a fixed collar 58 is secured. Between the fixed collar 58 and the upper end of the valve housing 51, a spring 59 is interposed to bias the valve to an open position. A strain release spring 60, which offers a relatively large resistance to compression as compared with spring 59, is located between the fixed collar 58 and the collar 56 and functions to allow further movement of the arm 55 after the valve 53 has engaged the seat. The control valve 50 is provided with three ports. Into one of these is secured the pipe 61 which serves to connect the interior of the control valve 50 with the inlet chamber of the main valve. Secured to a second of these ports is a pipe 62 which serves to connect the interior of the valve with the outlet chamber of the valve. A pipe 63 is secured in a third of these ports and serves to connect the control valve 50 with a solenoid valve 64.

The solenoid valve 64 comprises a valve housing 65 which is provided with upper and lower valve seats 66 and 67. Attached to the upper end of the valve housing 65 is a solenoid coil 68 which has associated therewith a movable core 69. The core 69 is rigidly connected to a valve stem 70 which carries a valve 71 at its lower end. When valve 71 is in its lowermost position it seats on the valve seat 66 and in its uppermost position seats on the valve seat 67. Valve 64 is similarly provided with three ports, one of which is the one to which pipe 63 is connected. A pipe 72 is connected to a second of these ports and serves to establish communication between the interior of the valve and the interior of the casing 23. A pipe 73 is connected to the third of these ports and leads to some suitable exhaust point such as adjacent the gas burner.

In a previous paragraph, reference was made to a shaft 48 which serves to connect the lever 42 with the arm 55. The means whereby leakage is prevented at the point that this shaft passes through the wall of the casing 23 is shown in Figure 2. The shaft 48 is journalled in two bearing members 75 and 76 which are threaded into opposite sides of the chamber 23. The bearing 75 has a cylindrical socket into which the shaft 54 slidably extends. The bearing member 76 is provided with a passage which extends entirely therethrough and through which the shaft 48 extends. At the point where shaft 48 enters the inner end of the bearing member 76, the shaft is provided with an enlarged head 77 having a conical surface. A spring 49 bears at one end against the interior of bearing member 75 and at the other end against the lever 42, which is rigidly secured to the shaft 48. This spring 49 serves to yieldably urge the conical head 77 into engagement with the bearing member 76 with the result that a seal is provided which does not impede in any manner the free rotation of shaft 48 and which automatically takes up any wear that may occur in said sealing means.

Attached at the outer end of shaft 48 is a second arm 78 which arm may be employed to actuate any suitable apparatus, which when the controller is employed with a gas valve may suitably be the secondary air damper.

In Figure 3 I have disclosed, as previously indicated, my controller associated with a gas furnace and with a thermostat to control the solenoid valve 64. In this figure, the gas furnace is indicated by the reference numeral 79 and is shown more or less schematically with a portion broken away to show a secondary air damper 80. This damper is pivotally mounted within the casing of the burner. A stop 81 is provided to limit the downward movement thereof. The damper 80 is connected through a suitable yielding connection 82 with the end of arm 78, which in the present instance functions as a secondary air arm. The pipe 73, which as previously indicated is connected to a suitable exhaust point, is shown in this case as extending within the furnace casing. Connected thereto is another pipe 83 which pipe is connected to the interior of the casing 25 so as to insure that this casing will always be at atmospheric pressure.

A thermostat 84 is connected through conductors 85, 86 and 87 with the terminals of the solenoid 68 and with the opposite terminals of a secondary 88 of a step-down transformer 89 which serves to supply low voltage power for the operation of the solenoid valve 64. This transformer 89 comprises in addition to the low voltage secondary 88, a line voltage primary 90 which is connected to line wires 91 which lead to a suitable source of power.

It will, of course, be understood that the inlet of valve 11 is connected to a gas supply pipe which is indicated in the drawing by the reference numeral 92 and the outlet of the valve casing is connected to a pipe 93 which is in turn connected to the gas burner (not shown).

The operation of my motor actuating controller will now be described. In the position shown, by reason of the fact that the spring 35 biases diaphragm 28 downwardly, the valve disc 16 is held against the valve seat and maintains the valve in a closed position. In view of the fact that the valve 71 is in its lowermost position preventing communication between pipe 63 and the interior of chamber 23 the pressure of the supply line cannot be applied to the diaphragm 28 so that the biasing action of the spring 35 is effective to hold the valve closed. Upon the temperature in the space to be heated dropping below a desired value, the thermostat 84 will cause the circuit to the solenoid 68 to be closed with the result that the solenoid core 69 is raised upwardly carrying the valve 71 from the position in which it engages with valve seat 66 into engagement with valve seat 67. When this movement of valve 71 takes place, communication between the interior of chamber 23 and the atmosphere through pipe 73 is interrupted and the interior of the chamber is now connected with the inlet chamber of the valve housing 11 through pipes 72, 63, and 61, all of which are now in communication. This will result in the interior of chamber 23 being subjected to a pressure substantially equal to that of the fuel line pressure with the result that diaphragm 28 is moved upwardly against the action of spring 35 moving valve disc 16 out of engagement with the seat. The movement of diaphragm 28, by reason of being subjected to the inlet pressure, will cause rotation of arm 55 through the movement of lever 42 with the result that valve 53 is moved downwardly. The inlet pressure is of sufficient magnitude to cause valve 53 to move into engagement with the valve seat 52. The result of this change in the position of valve 53 will be to interrupt the communication between pipes 61 and 63 and establish communication between pipes 62 and 63. As the result of this establishment of communication between pipes 62 and 63 the interior chamber 23 is placed in communication with the interior of the outlet chamber of the valve body through pipes 72, 63 and 62. When the diaphragm 28 has moved to a position wherein this change in the position of valve 53 takes place the valve disc 16 has moved to a point at which it no longer controls the flow and in which valve disc 17 primarily controls the flow. Thus when the interior of casing 23 is subjected to the outlet pressure, any increase in outlet pressure will cause valve disc 17 to move closer to the valve seat, thus cutting down the flow of gas through the valve and reducing the pressure. Conversely, any decrease in outlet pressure will move valve disc 17 from seat 15 and increase the flow of gas to the valve tending to again raise the pressure. In this manner, a constant outlet pressure is maintained.

As is well known, it is highly desirable to maintain the secondary air damper closed when the burner is not being operated to prevent the heat from passing up the stack. At the same time, it is imperative that this damper be open when the burner is moved to prevent the formation of carbon monoxide. By means of the secondary air arm 78, it is possible to insure that the damper 80 will be opened whenever the burner is in operation and closed when the same is out of operation. It will readily be seen that any upward movement of diaphragm 29 causes a downward movement of arm 78 tending to open the damper 80. The throw of lever 78 is sufficient so that the initial movement of diaphragm 28 in opening the valve by moving valve disc 16 away from the seat is sufficient to allow lever 78 to permit damper 80 to open to the point where it rests against stop 81. Any further movement of the arm 78 has no effect upon the damper 80 and is not affected in any way by the weight of the damper. In this manner, the effect of the damper is eliminated during the pressure regulating portion of the operation of my controller so that the operation thereof as a pressure regulator will not be affected by the weight of the damper acting on the secondary air arm.

In the event that for some reason the gas pressure reduces practically to a zero value, valve disc 17, which as previously explained controls the flow of fuel to the valve during the pressure regulating portion of the operation, will be moved further away from the seat in an effort to increase the outlet pressure. Due to the low inlet pressure this movement will take place to the point where the lowering of diaphragm 28 permits the valve 53 to move to its uppermost position thus interrupting communication between the outlet chamber and the interior of chamber 23. At the same time, the interior of the outlet chamber is connected with the inlet chamber of the valve housing 11 with the result that the pressure now opposing the spring 35 is the inlet pressure. Since this pressure has practically a negligible value the valve will move to a closed position.

If for any reason, a rupture should occur in the diaphragm, the gas which escapes will be led through pipe 83 to the burner or some other point where it will safely be disposed of.

It will be seen that I have provided a relatively simple motor operated controller which is readily adaptable for use as a combined shut-off and pressure regulating valve and in which a single diaphragm is employed to operate the valve both to shut off fluid flow and to regulate the outlet pressure thereof.

While I have shown a specific embodiment of my invention it will be understood that this is for purposes of illustration only and that my invention is limited only by the scope of the appended claims.

I claim as my invention:

1. In combination, a fluid fuel burner, a fuel valve in control of the flow of fuel to the burner, a pressure motor comprising a movable wall, means connecting said movable wall with said valve and operative to move said valve from closed to open and back to closed position upon continuous movement of said wall in one direction, means for subjecting said pressure motor to the pressure in the fuel line when said wall is in a position in which the valve is closed, to open said valve, and means responsive to movement of said wall and operative upon said wall being moved to an intermediate position in which said valve is open, to subject said motor to the fuel pressure adjacent the burner.

2. In combination, a fluid fuel burner, a fuel valve in control of the flow of fuel to the burner, a pressure motor comprising a movable wall, means connecting said movable wall with said valve and operative to move said valve from closed to open and back to closed position upon continuous movement of said wall in one direction, means for subjecting said pressure motor to the pressure in the fuel line when said wall is in a position in which the valve is closed to open said valve, means operative upon said wall being moved to an intermediate position in which said valve is open, to subject said motor to the fuel pressure adjacent the burner, and thermostatic means controlling the operation of both of said two last mentioned means.

3. In combination, a fluid fuel burner, a fuel valve in control of the flow of fuel to the burner, a pressure motor comprising a movable wall, means connecting said movable wall with said valve and operative to move said valve from closed to open and back to closed position upon continuous movement of said wall in one direction, means for subjecting said pressure motor to the pressure in the fuel line when said wall is in a position in which the valve is closed to open said valve, means operative upon said wall being moved to an intermediate position in which said valve is open, to subject said motor to the fuel pressure adjacent the burner, and valve means controlled in accordance with the temperature of a space, operative to permit said two last mentioned means to operate upon the temperature falling below a predetermined value and to subject said pressure motor to atmospheric pressure upon the temperature rising above said predetermined value.

4. In combination, a fluid fuel burner, a fuel valve in control of the flow of fuel to the burner, a pressure motor comprising a movable wall, means connecting said movable wall with said valve and operative to move said valve from closed to open and back to closed position upon continuous movement of said wall in one direction, and means responsive to the temperature of a space operative upon said temperature falling below a predetermined value to subject said pressure motor first to the pressure of the fuel line until the wall has moved to a position in which the valve is open, then to the fuel pressure adjacent the burner so as to regulate the position of said valve in accordance with said pressure adjacent the burner, and finally upon the temperature obtaining a value greater than said predetermined value, to the atmospheric pressure to cause said valve to close.

5. In combination, a fluid fuel burner, a fuel valve in control of the flow of fuel to the burner, a damper in control of the air supplied to the burner, a pressure motor comprising a movable wall, means connecting said movable wall with said valve and operative upon movement of the wall due to a change in the pressure in said motor from one extreme position to an intermediate position to open said valve, said means being operative upon further movement of said wall from said intermediate position to a second extreme position to again close said valve, means selectively to subject said pressure motor to the fuel line pressure to open the valve, to the fuel pressure adjacent the burner to cause the valve to regulate said pressure, and to the atmospheric pressure to close the valve, and a connection between said wall and said damper to maintain said damper in open position when said pressure motor is subjected to either the fuel line pressure or the pressure adjacent the burner.

6. In combination, a fluid fuel burner, a fuel valve in control of the flow of fuel to the burner, a damper in control of the air supplied to the burner, a pressure motor comprising a movable wall, means connecting said movable wall with said valve and operative upon movement of the wall due to a change in the pressure in said motor from one extreme position to an intermediate position to open said valve, said means being operative upon further movement of said wall from said intermediate position to a second extreme position to again close said valve, means selectively to subject said pressure motor either to the fuel line pressure to move said wall to a position between said intermediate position and said second extreme position wherein said valve is open and further movement of said wall is effective to move the valve to closed position or to the fuel pressure adjacent said burner to cause said valve to be controlled by said pressure, connections between said wall and said damper to positively control the position of the damper in accordance with the position of the wall only when said wall is between said first extreme position and said intermediate position, and further means to control the position of the damper independently of said wall when the latter is between its intermediate position and its second extreme position.

7. In combination, a pressure motor having a movable wall, a valve body having inlet and outlet chambers, a valve in said valve body, means connecting said valve to said movable wall and operative to move said valve from closed to open and back to closed position upon continuous movement of said wall in one direction, means for establishing communication between said motor and said inlet chamber to open said valve, and further means responsive to the movement of said valve wall and operative upon said wall assuming a position wherein said valve is open to establish communication between said motor and said outlet chamber.

8. In combination, a pressure motor having a movable wall, a valve body having inlet and outlet chambers, a valve in said valve body, means connecting said valve to said movable wall and operative to move said valve from closed to open and back to closed position upon outward movement of said wall, means to establish communication between said motor and said inlet chamber when said well is in a position in which said valve is not fully open, said means being responsive to the movement of said wall and operative to interrupt said communication between the motor and the inlet when the valve is fully open and to establish communication between said motor and said outlet chamber.

9. In combination, a pressure motor having a movable wall, a valve body having inlet and outlet chambers, valve means comprising a valve seat and a pair of spaced valve members adapted to engage said valve seat on opposite sides thereof, means connecting said valve members to said wall and operative upon the wall being within one range of positions to cause one of said valve members to be nearer the seat and upon the wall being within another range of positions to cause the other valve member to be nearer the seat and means operative to establish communication between said motor and said inlet chamber when one of said valve members is nearer the seat and between said motor and said outlet chamber when said other valve member is nearer the seat.

10. In combination, a fluid fuel burner, a pair of valve means in control of the fuel supplied to the burner, a pressure motor having a movable wall, means for connecting said wall with said valve means and operative to cause one of said valve means to control the flow of fuel when said wall is within first range of positions and to cause the other valve means to control the flow of fuel when said wall is within a second range of positions and means for controlling the pressure within said pressure motor to selectively cause said wall to move within either range of positions, said last named means comprising valve means for selectively subjecting one side of said movable wall to either the pressure of the fuel or to that of the atmosphere.

11. In combination, a fluid fuel burner, a pair of valve means in control of the fuel supplied to the burner, a pressure motor having a movable wall, means for connecting said wall with said valve means and operative to cause one of said valve means to control the flow of fuel when said wall is within a first range of positions and to cause the other valve means to control the flow of fuel when said wall is within a second range of positions and means to subject said motor to the fuel line pressure to cause the movement of said wall to a position within said second range of positions and operative upon such movement to subject said motor only to the pressure adjacent the burner.

12. In combination, a fluid fuel burner, a pair of valve means in control of the fuel supplied to the burner, a pressure motor having a movable wall, means for connecting said wall with said valve means and operative to cause one of said valve means to control the flow of fuel when said wall is within a first range of positions and to cause the other valve means to control the flow of fuel when said wall is within a second range of positions, means to subject said motor to the fuel line pressure to cause the movement of said wall to a position within said second range of positions and operative upon such movement to subject said motor only to the pressure adjacent the burner, and further temperature responsive means controlling said last named means.

13. In combination, a fluid fuel burner, a first fuel valve means, a second fuel valve means, a pressure motor having a movable wall, connections between said movable wall and both of said valve means operative to cause said first valve means to move towards open position upon outward movement of the wall and to cause said second valve means to move towards closed position upon outward movement of the wall, said means being operative to cause said first valve means to be in controlling position during the initial outward movement of said wall and said second valve means to be in controlling position during the final outward movement of said wall, and automatic means to vary the pressure to which said pressure motor is subjected to selectively place either of the two valve means in controlling position, said automatic means comprising valve means for selectively subjecting one side of said movable wall to either the pressure of the fuel or to that of the atmosphere.

14. In combination a fluid fuel burner, a first fuel valve means, a second fuel valve means, a pressure motor having a movable wall, connections between said movable wall and both of said valve means operative to cause said first valve means to move towards open position upon outward movement of the wall and to cause said second valve means to move towards closed position upon outward movement of the wall, said means being operative to cause said first valve means to be in controlling position during the initial outward movement of said wall and said second valve means to be in controlling position during the final outward movement of said wall, and means to subject said motor to the fuel line pressure to move said wall outwardly sufficiently to cause said second valve means to be in control, and operative upon such movement of the wall taking place to subject said motor to the outlet pressure.

15. In combination, a fluid fuel burner, a first fuel valve means, a second fuel valve means, a pressure motor having a movable wall, connections between said movable wall and both of said valve means operative to cause said first valve means to move towards open position upon outward movement of the wall and to cause said second valve means to move towards closed position upon outward movement of the wall, said means being operative to cause said first valve means to be in controlling position during the initial outward movement of said wall and said second valve means to be in controlling position during the final outward movement of said wall, means to subject said motor to the fuel line pressure to move said wall outwardly sufficiently to cause said second valve means to be in control and operative upon such movement of the wall taking place to subject said motor to the outlet pressure, and temperature responsive means controlling said last mentioned means.

16. In combination, a fluid fuel burner, a first fuel valve means, a second fuel valve means, a pressure motor having a movable wall, connections between said movable wall and both of said valve means operative to cause said first valve means to move towards open position upon outward movement of the wall and to cause said second valve means to move towards closed position upon outward movement of the wall, said means being operative to cause said first valve means to be in controlling position during the initial outward movement of said wall and said second valve means to be in controlling position during the final outward movement of said wall, means to subject said motor to the fuel line pressure to move said wall outwardly sufficiently to cause said second valve means to be in control and operative upon such movement of the wall taking place to subject said motor to the outlet pressure, further temperature responsive means controlling said last mentioned means, and further means operative to cause said last means to function upon a decrease in the temperature of a space heated by said burner below a predetermined value and operative upon said temperature reaching said predetermined value to subject said motor to atmospheric pressure.

17. In a combination pressure regulating and shut off valve mechanism, a pressure motor having a movable wall, a valve body having inlet and outlet passages, valve means comprising a pair of valve seats and a pair of fixedly spaced aligned valve members adapted to engage said seats upon opposite movement thereof, means connecting said valve members to said wall and operative upon the wall being within one range of positions to cause one of said valve members to be nearer its seat and upon the wall being within another range of positions to cause the other valve member to be nearer its seat, a two position control valve, a bleed line leading to the atmosphere, connections between said two position valve, said valve body, said bleed line, and one side of said diaphragm such that when said control valve is in one position the pressure of the valved fluid is applied to said one side of said diaphragm and when said control valve is in its other position, said one side of the diaphragm is connected to the bleed line, and biasing means acting on said valve means so that upon failure of fluid pressure, one of said valve members is moved into engagement with its seat to shut off the flow of fluid.

CARL G. KRONMILLER.